US008484679B1

(12) United States Patent
Chtchedrina et al.

(10) Patent No.: US 8,484,679 B1
(45) Date of Patent: Jul. 9, 2013

(54) SYSTEM FOR PROCESSING PROGRAM GUIDE INFORMATION ITEMS FOR THE CREATION OF A PROGRAM GUIDE

(76) Inventors: Veronica Vitalyevna Chtchedrina, Upper Montclair, NJ (US); Alexander James Burke, Upper Montclair, NJ (US)

( * ) Notice: Subject to any disclaimer, the term of this patent is extended or adjusted under 35 U.S.C. 154(b) by 3210 days.

(21) Appl. No.: 09/976,874

(22) Filed: Oct. 12, 2001

Related U.S. Application Data

(60) Provisional application No. 60/246,917, filed on Nov. 10, 2000.

(51) Int. Cl.
*G06F 3/00* (2006.01)
*G06F 13/00* (2006.01)
*H04N 5/445* (2011.01)

(52) U.S. Cl.
USPC ............... 725/42; 725/37; 725/39; 725/40; 725/44

(58) Field of Classification Search
USPC .............................................. 725/48, 87, 52
See application file for complete search history.

(56) References Cited

U.S. PATENT DOCUMENTS

| | | | | |
|---|---|---|---|---|
| 5,353,121 | A | | 10/1994 | Young et al. ................... 348/563 |
| 5,488,409 | A | | 1/1996 | Yuen et al. ........................ 348/5 |
| 5,532,754 | A | | 7/1996 | Young et al. ................... 348/569 |
| 5,541,738 | A | | 7/1996 | Mankovitz ..................... 358/335 |
| 5,727,060 | A | | 3/1998 | Young ............................. 380/10 |
| 5,808,608 | A | | 9/1998 | Young et al. ................... 345/327 |
| 5,818,439 | A | * | 10/1998 | Nagasaka et al. ............... 725/87 |
| 5,907,322 | A | | 5/1999 | Kelly et al. .................... 345/327 |
| 5,936,611 | A | | 8/1999 | Yoshida ........................ 345/158 |
| 5,940,073 | A | * | 8/1999 | Klosterman et al. .......... 715/721 |
| 6,061,097 | A | | 5/2000 | Satterfield ..................... 348/569 |
| 6,091,884 | A | | 7/2000 | Yuen et al. ...................... 386/83 |
| 6,130,726 | A | | 10/2000 | Darbee et al. ................. 348/734 |
| 6,172,677 | B1 | | 1/2001 | Stautner et al. ............... 345/352 |
| 6,182,287 | B1 | * | 1/2001 | Schneidewend et al. ........ 725/48 |
| 6,256,648 | B1 | | 7/2001 | Hill et al. ...................... 707/501 |
| 6,553,178 | B2 | * | 4/2003 | Abecassis ...................... 386/83 |
| 6,711,741 | B2 | * | 3/2004 | Yeo ................................. 725/87 |
| 6,806,889 | B1 | * | 10/2004 | Malaure et al. ............... 715/733 |
| 6,938,268 | B1 | * | 8/2005 | Hodge ........................... 725/93 |
| 7,028,327 | B1 | * | 4/2006 | Dougherty et al. ............. 725/93 |

OTHER PUBLICATIONS

*TV Guide Online at* www.tvguide.com Oct. 1, 2001.

(Continued)

*Primary Examiner* — Justin Shepard
(74) *Attorney, Agent, or Firm* — Alexander Burke

(57) ABSTRACT

A system provides an intra-program event guide for display. The intra-program event guide enables a User to identify the events (e.g. scenes, episodes, alternative scenes, program portions etc.) occurring within a program and to initiate viewing (or initiate other functions associated with the event) via the guide. A method for processing information concerning intra-program events (e.g. comprising particular MPEG compatible groups of pictures (GOPS)) occurring within a program involves receiving signal data and identifying in the signal data information items describing intra-program events occurring during a program. The information items describing intra-program events are processed to provide processed data representative of intra-program events sequentially ordered by time and the processed data is communicated to a device. Generation of an intra-program event guide of the information items is initiated in response to user command. The guide shows other types of information items describing intra-program events scheduled for occurrence during a program. Such other types of events include, for example, (a) web page display, (b) software download, (c) PIP (Picture-in-Picture) image display, and (d) peripheral operation.

22 Claims, 4 Drawing Sheets

OTHER PUBLICATIONS

GIST TV Listings at www.gist.com Oct. 1, 2001.
Yahoo TV Listings Oct. 1, 2001.
DIRECTTV Listing grid Oct. 1, 2001.
Starsight Interactive TV Grid Guide Oct. 1, 2001.
www.courttv.com TV schedule Oct. 1, 2001.

* cited by examiner

SYSTEM FOR PROCESSING PROGRAM GUIDE INFORMATION ITEMS FOR THE CREATION OF A PROGRAM GUIDE

This is a non-provisional application of provisional application Ser. No. 60/246,917 by V. Chtchedrina filed Nov. 10, 2000.

FIELD OF THE INVENTION

This invention is related to the field of digital signal processing, and more particularly to the acquisition, formation and processing of Program Guide Information, and program content data from multiple sources, e.g. Internet, DVD, cable, satellite and terrestrial sources.

BACKGROUND OF THE INVENTION

Home entertainment systems are receiving data and programs on increasing numbers of communication channels and from an increasing number of sources including Internet, satellite and terrestrial sources. Program content may be received as High Definition Television (HDTV) broadcasts, Multi-point Microwave Distribution System (MMDS) broadcasts and Digital Video Broadcasts (DVB). Program content may also be received from local sources such as Digital Video Disk (DVD), CDROM, VHS and Digital VHS (DVHS™) type players, PCs, and many other types of sources. It is becoming increasingly important to be able to index and catalogue the wide variety of program content available from these sources and to present this index to a User in an easily understandable form. A program guide is one means of presenting an index of available content to a User. However, it is desirable for a User to be able to easily operate such a program guide and to be able to navigate the available content items to identify the programs of interest.

A number of problems arise in developing a program guide in a digital TV system environment involving hundreds of available program channels. Specifically, problems arise in providing a simple command interface for a program guide that is suitable for the general public for navigating the large number of available programs and channels. These problems and related problems are addressed by a system according to the present invention.

SUMMARY OF THE INVENTION

A system provides an intra-program event guide for display. The intra-program event guide enables a User to identify the events (e.g. scenes, episodes, alternative scenes, program portions etc.) occurring within a program and to initiate viewing (or initiate other functions associated with the event) via the guide. A method for processing information concerning intra-program events (e.g. comprising particular MPEG compatible groups of pictures (GOPS)) occurring within a program involves receiving signal data and identifying in the signal data information items describing intra-program events occurring during a program. The information items describing intra-program events are processed to provide processed data representative of intra-program events sequentially ordered by time and the processed data is communicated to a device.

In a feature of the invention, generation is initiated of an intra-program event guide of the information items in response to user command.

In another feature, the guide shows other types of information items describing intra-program events scheduled for occurrence during a program. Such other types of events events include, for example, (a) web page display, (b) software download, (c) PIP (Picture-in-Picture) image display, and (d) peripheral operation.

DETAILED DESCRIPTION OF THE DRAWINGS

Figure 1:
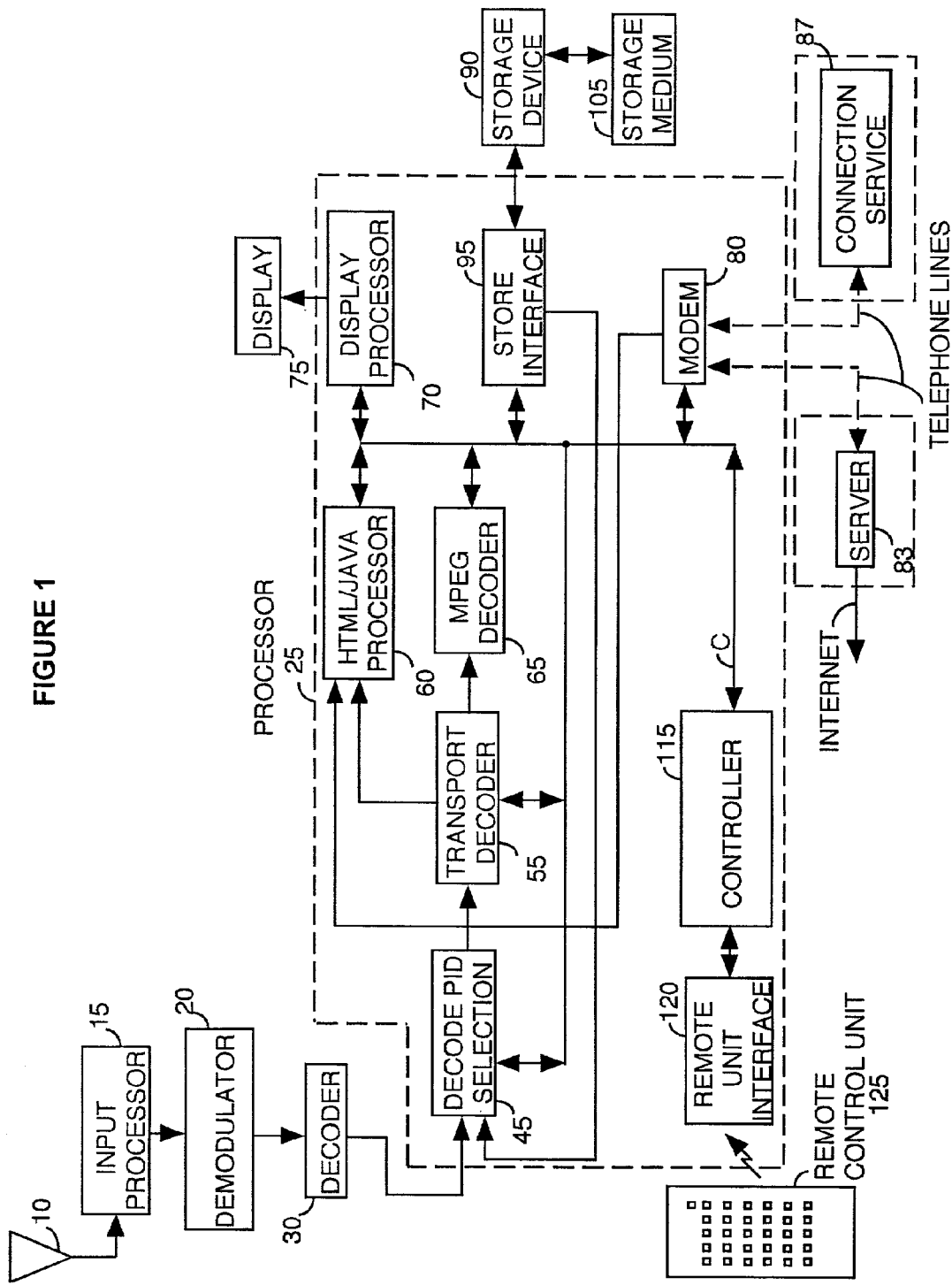
FIG. 1 shows a home entertainment decoder system, according to the invention, for communicating with a plurality of sources and for processing program guide information and program content data.

FIG. 1 shows a home entertainment decoder system, according to the invention, for communicating with multiple sources to create an intra-program event guide for display. The intra-program event guide enables a User to identify the events (e.g. scenes, episodes, program portions etc.) occurring within a program and to initiate viewing (or initiate other functions associated with the event) via the guide. The program guide also allows a User to select alternative scenes to play in a movie, for example. In addition, the guide displays other types of information items describing intra-program events scheduled for occurrence during a program. Such events include, for example, (a) web page display, (b) software download, (c) PIP image display, and (d) peripheral operation. These features advantageously enable a User to efficiently navigate through program content to find and view the particular events of interest. These features also advantageously show a User when a web page or PIP image is to be displayed within a program and indicate to a User when an event occurs involving the operation of peripheral apparatus either external to, or incorporated within, the entertainment system. Such events may include, for example, the download of game (or other) software which may be associated with a program scheduled for broadcast or may be associated with an independent event. Another such event would involve scheduled initiation of a printer or other peripheral such as a personal computer (PC), video receiver, audio receiver, VCR, DVD, scanner, copier, telephone, fax machine and home appliance, for example.

Although the disclosed system is described in the context of a system for receiving an MPEG compatible signal, it is exemplary only. The MFEG2 (Moving Pictures Expert Group) image encoding standard, hereinafter referred to as the "MPEG standard" is comprised of a system encoding section (ISO/IEC 13818-1, 10th Jun. 1994) and a video encoding section (ISO/IEC 13818-2, 20th Jan. 1995), hereinafter referred to as the "MPEG systems standard" and "MPEG video standard" respectively. The principles of the invention may be applied to systems in which the types of transmission channels and communication protocols may vary, or to systems in which the coding type may vary. Further, although the disclosed system is described as processing broadcast programs, this is exemplary only. The term 'program' is used to represent any form of data such as telephone messages, computer programs, Internet data or other communications, for example.

In the video receiver system of FIG. 1, a carrier modulated with video data is received from a broadcast satellite by antenna 10 and processed by unit 15. The resultant digital output signal is demodulated by demodulator 20 and decoded and error corrected by decoder 30. In this exemplary embodiment, the demodulated and decoded output from unit 30 is in the form of an MPEG compatible transport stream containing MPEG compressed video data and Internet data encoded in HTML. Video data encoded to the MPEG standard is in the form of a packetized datastream which typically includes the data content of many program channels (e.g. content corresponding to cable television channels 1-125).

The MPEG compatible transport stream is provided to processor 25 which is responsive to commands from remote control unit 125. Processor 25 communicates with other data sources including storage device 90 and either Internet data server 83 or Internet connection service 87 (e.g. America On-line™). Program guide information and information describing intra-program events is acquired and collated automatically from the input transport stream and storage device 90 and from the Internet from either server 83 or connection service 87. The intra-program events comprise scenes, episodes or program portions etc. occurring within a program or may comprise events scheduled for occurrence during a program such as web page display, software (e.g. game) download, PIP image display, or peripheral operation. The intra-program event guide also identifies events involving the operation of peripheral apparatus either external to, or incorporated within, the entertainment system.

The acquired information is processed by unit 25 to form a program guide showing intra-program events. The program guide may also incorporate selection options allowing a User to initiate Email, telephone, Internet access, fax and video-phone functions among others, for example. The information conveying the program guide for display is acquired from non-displayed ancillary information within the transport datastream input to processor 25 from unit 30. This information may also be acquired from ancillary information provided by multiple additional sources such as from Internet server 83 or service 87 or from cable TV (CATV) or satellite broadcast sources (not shown to preserve drawing clarity). The conveyed ancillary information also supports identification and assembly of the individual data packets that constitute the programs, scenes, or episodes etc., that are selected for decoding and User viewing or listening. The ancillary information is used in recovering content from multiple sources.

Processor 25 adaptively decompresses the input compressed video data and decodes the HTML Internet data to provide a formatted composite video image for display on unit 75. Processor 25 also provides encoded data outputs for storage on storage medium 105 via storage device 90, and provides encoded data to other devices (not shown to simplify drawing) via modem 80 and telephone lines.

A video receiver user initiates functions including Email, telephone, Internet access, fax and video-phone functions and viewing and storage of selected programs via selection of options from the displayed intra-program event guide. A User selects a displayed option with a cursor using remote control unit 125. Commands from remote control 125 are passed via interface 120 to controller 115 within processor 25. Unit 115 controls the operation of the elements of processor 25 and responds to remote control unit 125 commands using a bi-directional data and control signal bus C. Controller 115 controls the functions of individual elements within processor 25 by setting control register values within these elements with control bus C. Processor 25 also supports the storage and retrieval of data from storage medium 105 via storage device 90. Storage device 90 is a DVD type device and medium 105 comprises a multi-disk stack unit containing a plurality of disks in this exemplary embodiment.

In response to control signal C, unit 45 selects either the transport stream from unit 30, or in a playback mode, a datastream retrieved from storage device 90 via store interface 95. In normal, non-playback operation, individual packets that comprise program guide and intra-program guide information are identified by unit 45 in the transport stream from unit 30 using data identifiers (e.g. packet identifiers—PIDs) and the packet data is assembled by controller 115 for storage in unit 115 internal memory. The data identifier information that enables controller 115, in conjunction with unit 45, to identify data packets that comprise individual programs, as well as intra-program events and associated program guide information, is conveyed within a program map (or channel map) in ancillary information. The program map associates data identifiers with individual packetized datastreams that constitute a program, intra-program event or program guide information. Ancillary information in the transport stream from unit 30 may also contain additional information, e.g. packet assembly information, supporting the recovery of program, intra-program event or associated program guide data from the input transport stream. The ancillary information may also contain data for use in commanding the operation of peripheral devices, e.g., to store files or other downloaded information.

In playback mode, controller 115 also configures unit 45 using Control signal C to select the data packets comprising the DVD program guide and intra-program event guide information derived from DVD storage device 90 via interface 95. Controller 115 accesses and assembles in its internal memory those packets captured by unit 45 comprising the DVD program guide and intra-program event guide information. Similarly, in Internet access mode, controller 115 acquires Internet program guide and intra-program event guide information from Internet server 83 or from Internet connection service 87 via modem 80. Packets comprising HTML or Java intra-program event guide data are identified by unit 45 and provided to a dedicated buffer in decoder 55. The dedicated buffer in transport decoder 55 holds data to be decoded by processor 60.

Processor 55 derives system information including timing, error and synchronization information from the datastream from unit 45 and provides it to controller 115. Controller 115 applies the system information in directing processor 55 to provide HTML or Java intra-program event guide data from the dedicated buffer in decoder 55 to HTML™/Java™ processor 60. Processor 60 decodes the HTML™ and Java™ data and provides image representative pixel data for storage in memory within controller 115. Although processor 60 is shown as a separate processor in FIG. 1, it may also be implemented within the software of controller 115. Processor 60 comprises the processing functions of a special web browser, including the JPEG decompression and Java decoding functions involved in the operation of Netscape Navigator™, for example.

MPEG compatible program content within the MPEG compatible transport datastream from decoder 30, is also decoded into pixel representative data by processor 25 in addition to the HTML™ and Java™ data processed by unit 60. Controller 115 applies the previously derived system information in directing processor 55 to provide synchronized program data from an application buffer in decoder 55 to MPEG decoder 65. The MPEG compatible program data is decompressed by MPEG decoder 65 to provide video pixel data and audio output data to display processor 70. The video pixel data from decoder 65 is stored in a pixel representative memory contained in display processor 70.

Controller 115 processes the program guide and intra-program event guide data, previously acquired via decode PID selection 45 and assembled in its internal memory, to provide image representative pixel data for storage in pixel memory within display processor 70. Controller 115 also retrieves the pixel data produced by HTML™ and Java™ processor 60 from internal memory and formats it for storage as an overlay in the pixel representative memory processor 70. Thereby, a composite display comprising an intra-program event guide is created from data elements conveyed in ancillary information within data input to processor 25 from unit 30 as well as from data input from storage device 90 and from data received from the Internet via modem 80. The composite display also includes HTML or Java data elements processed by unit 60. Display processor 70 converts the formatted composite intra-program event guide data into conventional luminance and chrominance components. Further, processor 70 processes the luminance and chrominance components, together with timing data provided by controller 115, in a conventional manner to form an NTSC signal for display on NTSC compatible image display 75.

Figure 2:
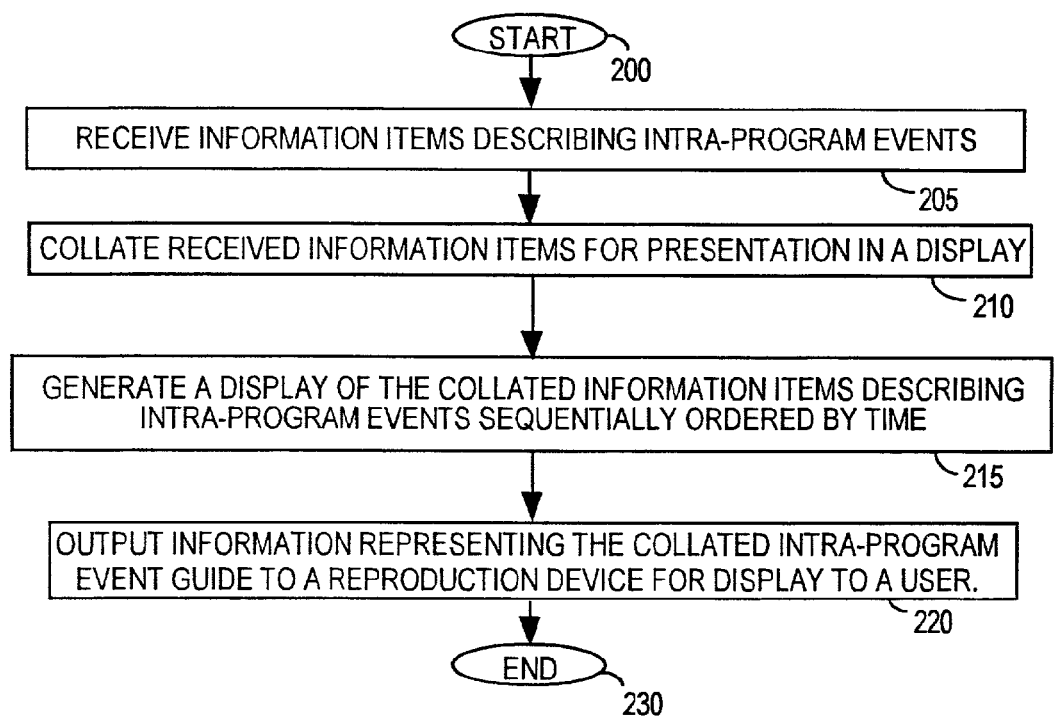
FIG. 2 shows a flowchart, according to the invention, for a process for providing an intra-program event guide for display.

Controller 115 (FIG. 1) employs the process of FIG. 2 to acquire and collate program guide information from a plurality of sources to form a composite intra-program event guide for display. In step 205, following the start at step 200, controller 115 acquires and stores program guide and intra-program event guide information from a broadcast source (e.g., via antenna 10 of FIG. 1) and from other sources (e.g., via server 83, Internet connection service 87 or DVD 90 of FIG. 1). The intra-program events comprise events occurring within a program such as episodes, program portions, scenes, or alternative scenes (e.g., that optionally varying program story line) selectable by a User, etc. These intra-program events may comprise a plurality of MPEG groups of pictures (GOPs), or MPEG compatible video sequences or audio segments or may comprise DVD specification compatible video object units (VOBUs) or video cells. Alternatively, the events may comprise streamed Internet sequences, HTML or Java elements or video or audio segments encoded in another type of data format. The intra-program events may also comprise other events scheduled for occurrence during a program such as web page display, software (e.g., game) download, PIP (picture-in-picture) image display, or peripheral operation.

Figure 3:
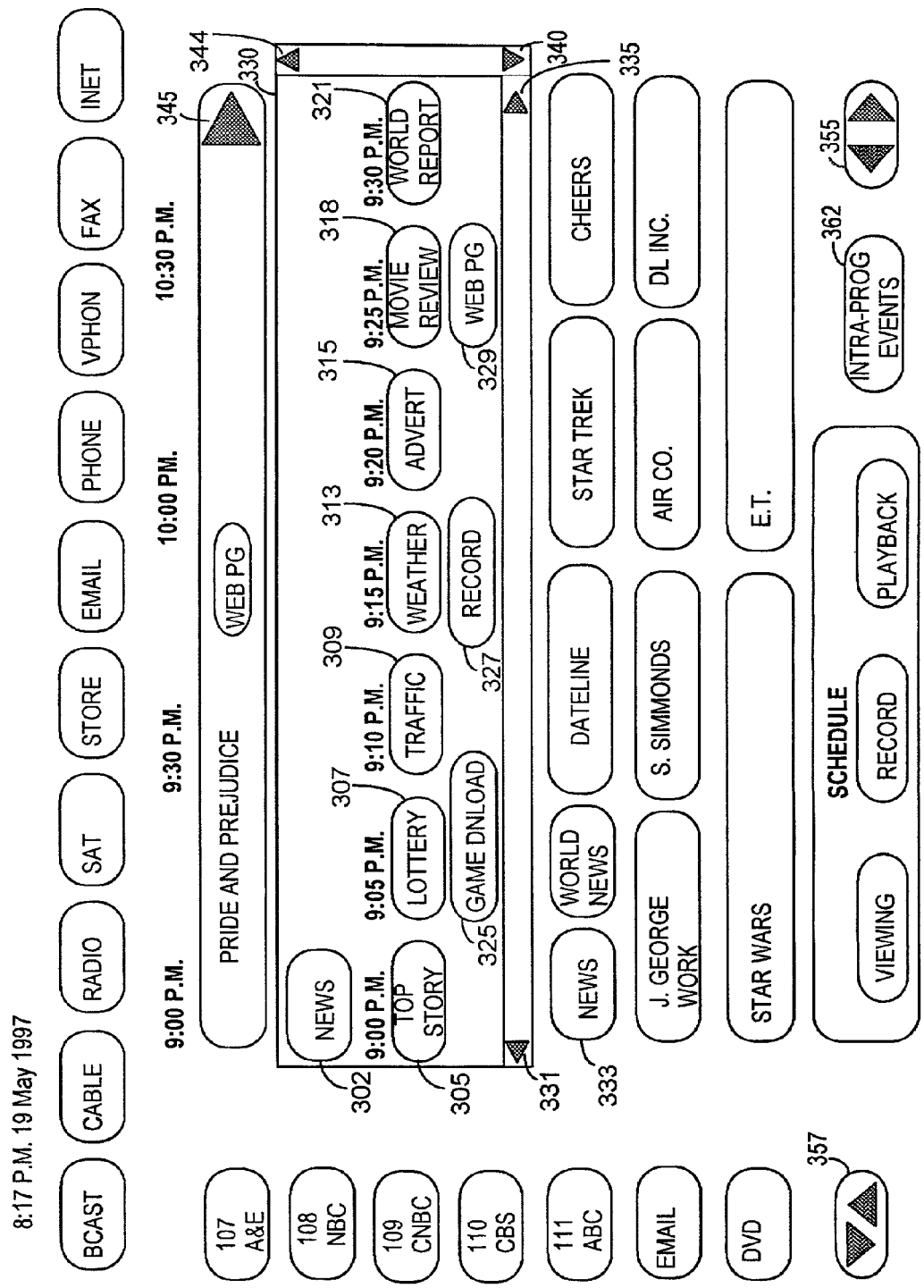
FIG. 3 shows an exemplary Program Guide display format according to the invention.
Figure 4:
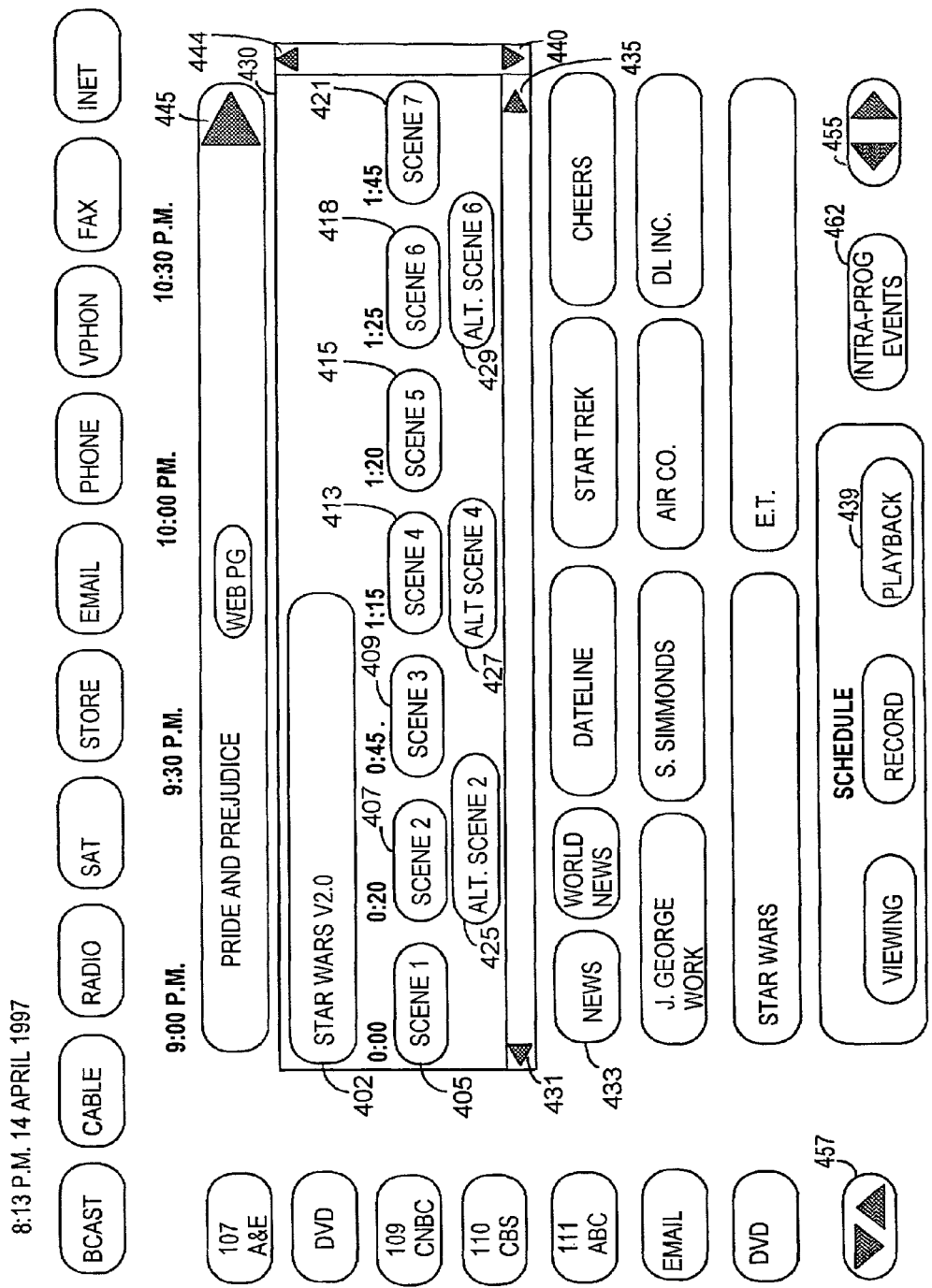
FIG. 4 shows another exemplary Program Guide display format according to the invention.

Controller 115, in step 210, collates the acquired program guide and intra-program event guide information for presentation in a composite display as exemplified in FIGS. 3 and 4. Controller 115, in steps 205 and 210, acquires and collates program guide and intra-program event guide items using a directory that associates data identifiers with individual program guide and intra-program event guide items. The directory also associates data identifiers with the data elements that comprise each program and intra-program event. The directory may be in the form of MPEG compatible data such as MPEG program specific information defined by section 2.4 of the MPEG systems standard. Alternatively, the directory may comply with the requirements of another different data format such as the read-only DVD data format defined by a proprietary standard adopted by a consortium of consumer electronics companies and described in available literature such as "DVD Demystified—The Guidebook of DVD-Video and DVD-ROM", 1997, by Jim Taylor published by McGraw Hill.

Controller 115 with processor 25 uses the acquired ancillary information and directory information to identify and assemble the data elements comprising program guide and intra-program event guide items and identifies and assembles the data elements comprising the corresponding program and intra-program events. In other embodiments, the data items may also be collated and assembled using codes partitioning elements of an individual program (into different scenes, for example) and identifying intra-program event boundaries. Such codes may comprise time stamps or assembly codes that are inserted into program content data for the purpose of supporting data assembly by identifying particular sections of the program or for identifying the time of occurrence of an intra-program event.

In step 215, controller 115 in conjunction with processor 25, generates an intra-program event guide as a composite display incorporating both program guide and intra-program event guide items. The guide, as exemplified in FIGS. 3 and 4, shows programs and intra-program events scheduled for occurrence in a display format that presents guide items sequentially ordered by time in the horizontal direction. In other embodiments the time axis may be in the vertical direction though other arrangements are equally possible. The intra-program event guide is hierarchically displayed in response to User selection of an icon in a first program guide display. Specifically, an intra-program event guide for a particular program (e.g. news program 302 in the guide of FIG. 3), is automatically displayed as an overlay (overlay 330 in FIG. 3) in a first program guide upon User selection of the particular item 302. Similarly, the intra-program event guide for a particular broadcast channel (e.g. NBC channel 108 icon in the guide of FIG. 3), may automatically be displayed as an overlay in a first program guide upon User selection of the particular item 108. Alternatively, User activation of the intra-program event guide may involve selection of a specific intra-program event icon (e.g. icon 362 in the guide of FIG. 3) in conjunction with selection of a particular program (e.g. news program item 302 in the guide of FIG. 3) or channel icon (e.g. NBC channel 108 icon in the guide of FIG. 3).

In step 220, controller 115 in conjunction with processor 25, provides data representing the collated intra-program event guide to a reproduction device (e.g., device 75 of FIG. 1) for display to a User. The displayed guide includes intra-program event items from a broadcast source and from other sources (e.g., DVD 90 or from the Internet via server 83 or Internet connection service 87 of FIG. 1). The process of FIG. 2 terminates at step 230.

FIGS. 3 and 4 show exemplary intra-program event guide displays. During operation of the FIG. 1 system, the intra-program event guide of FIG. 3 is automatically displayed as an overlay (overlay 330) in a first program guide upon User selection of news program item 302. The intra-program event guide in overlay 330 shows that news program 302, between 9:00 p.m. and 9:30 p.m., is composed of news items comprising, top story 305, lottery 307, traffic 309, weather 313, advertisement 315, movie review 318 and report 321. In addition, a game download is also scheduled to begin at 9:05 p.m. and peripheral activation of a recorder (item 327) is scheduled at 9:15 p.m. Further, a web page image (item 329) associated with movie review 318, is to be broadcast and displayed at 9:25 p.m. Thereby, the FIG. 3 intra-program event guide indicates to a User when an event occurs involving the operation of internal apparatus or external peripheral apparatus. Such external apparatus may comprise DVD 90 of FIG. 1, for example, and internal apparatus may comprise memory in processor 25 for holding web images. The described scheduled intra-program events are exemplary only and a variety of other different intra-program events may be involved in other embodiments. Further, a User may navigate forward and backward in time through the scheduled intra-program events by selection of navigation icons 331 and 335. A User may also navigate vertically through the various levels of available intra-program events by selection of navigation icons 340 and 344.

In similar fashion to FIG. 3, the intra-program event guide of FIG. 4 shows an overlay (overlay 430) displayed in a first program guide upon User selection of DVD movie item 402. The intra-program event guide in overlay 430 shows that DVD movie 402, between 0:00 and 1:45 hours of elapsed time, is composed of items comprising, scenes 1 to 7 (items 405-421). In addition, the intra-program event guide shows alternative scenes 2, 4 and 6 (items 425, 427 and 429 respectively) that may be optionally selected by a User to vary the movie story line, for example. A User selection of item 425, for example, substitutes alternative scene 2 (item 425) for the first scene 2 (item 407). A User may do this to vary story line, to edit the program for parental rating control purposes, to vary the length of play time or to see a director's cut of a movie, for example. A user may also employ the intra-program event guide to select a movie version based on pricing. Movie version billing may be structured to provide movie versions with the degree of advertisement content determined by the price paid. In this case, advertisements may be made an inherent part of movie scenes, for example. Alternatively, different program versions may be selectable for a variety of other purposes. A User may even be able to substitute his own content and thereby create his own version of a movie or program using this method.

Further, a User may play movie 402 from a particular scene (e.g., scene 3 item 409) by selecting the particular scene for play within the intra-program event guide. The User does this by selecting the scene (scene 3 in this example) and by subsequent activation of a play icon (e.g. playback icon 439) in the intra-program event guide. However, the User may do this in a variety of other ways such as by selecting one or more buttons on a remote control. The particular mechanism for selecting intra-program events for display, substitution or play is not critical and may be implemented in a number of ways. These ways may involve using remote unit 125 buttons in combination with displayed menu icons and a displayed cursor or by using another type of data/command entry scheme involving fixed or pull down menus. In addition, a different type of data entry device such as a keyboard may be used or the selection may be performed remotely via the Internet using a PC.

The architecture of FIG. 1 is not exclusive. Other architectures may be derived in accordance with the principles of the invention to accomplish the same objectives. Further, the functions of the elements of processor 25 of FIG. 1 and the process steps of FIG. 2 may be implemented in whole or in part within the programmed instructions of a microprocessor. In addition, the principles of the invention apply to any form of MPEG or non-MPEG compatible electronic program guide. Further, the principles of the invention apply to program guide displays on all forms of devices such as portable phones, portable movie players and TVs and any other device in which a guide or index to available content is desired and in which the content is sub-dividable into component parts.

What is claimed is:

1. A method for processing information concerning intra-program events occurring within a program, comprising the steps of:
    employing at least one processing device for,
        receiving signal data including information items describing intra-program events occuring during a program and comprising at least one of a) one or more scenes, b) episodes, c)chapters, and d) program portions;
        identifying said information items in signal data;
        processing said information items describing said intra-program events to provide processed data representative of intra-program events sequentially ordered by time;
        deriving time indicators using time stamps in content data representing said program, said time indicators indicating when said intra-program events start and indicating different sections of a program and indicating a broadcast time when said intra-program events start; and
    communicating said processed data to a device.

2. A method according to claim 1, wherein
    said time indicators are derived using time stamps in said content data,
    and including the step of,
    collating said information items to provide data representing said intra-program events sequentially ordered by time in a program guide.

3. A method according to claim 1, wherein
    said intra-program events comprise program elements occurring within a program including at least one of a) one or more scenes, b) episodes, c) chapters, and d) program portions and
    said time indicators indicate different sections of a program and indicate a broadcast time when said intra-program events start.

4. A method according to claim 1, including the step of
    initiating play or recording of a program starting at a particular intra- program event start time using a display image indicating said intra-program events sequentially ordered by time using time stamps in content data representing said program.

5. A method according to claim 1, including the step of
    initiating generation of a display of said information items describing intra-program events representing alternative program scene sequences optionally selectable by a user.

6. A method according to claim 5, wherein
    said optionally selectable alternative program scene sequences are selectable for at least one of a) parental rating content control, b) varying play time duration, c) choosing movie version based on price.

7. A method according to claim 1, wherein
    said intra-program events are program elements derived from at least one of a) a plurality of MPEG compatible groups of pictures (GOPS), b) one or more video cells, c) one or more video object units (VOBUs), d) at least one MPEG compatible video sequence and e) an audio segment and
    said time indicators indicate when said intra-program events start, at least one of, (i) relative to a program start time and (ii) at a broadcast time. least one of, (i) relative to a program start time and (ii) at a broadcast time.

8. A method according to claim 1, wherein said method is implemented in the programmed instructions of at least one controller and including the step of
    initiating generation of an intra-program event guide identifying said intra-program events sequentially ordered by time and including said time indicators indicating when said intra-program events start, in response to user command.

9. A method according to claim 8, wherein said intra-program event guide is displayed in a program guide image listing available programs on a plurality of channels in response to user selection of an icon in said displayed program guide.

10. A method according to claim 9, wherein said intra-program event guide lists events occurring during a particular program and including the step of initiating play or recording of a program starting at a particular intra- program event using said time indicators indicating when said intra-program events start in response to user selection of an item representing said particular intra-program event in said intra-program event guide.

11. A method according to claim 1, including the step of identifying said information items using one of, (a) a directory indicating elements of said program, and (b) codes partitioning elements of said program, said directory indicating elements of said program comprises directory information encompassed within at least one of, (i) MPEG compatible program data and (ii) digital video disk compatible program.

12. A method according to claim 1, wherein said time indicators arc derived using time stamps in said content data and indicate when said intra-program events end.

13. A method for processing information concerning intra-program events occuring within a program, comprising the steps of;
employing at least one processing device for,
receiving signal data containing information items describing intra-program events occuring during a program and comprising at least one of
(a) web page display, (b) software download, (c) PIP image display, and (d) peripheral operation;
identifying said information items in said signal data;
processing said information items describing intra-program events to provided processed data representative of intra-program events sequentially ordered by time;
deriving time indicators from within contents data representing said program exclusive of viewer interactive content associated with said program, said time indicators indicating when said intra-program events start and indicating different sections of a program and indicating a broadcast time when said intra-program events start; and
communicating said processed data to a device.

14. A method for processing information concerning intra-program events occurring within a program, comprising the steps of:
receiving signal data including information items describing intra-program events exclusive of viewer interactive events comprising a plurality of MPEG compatible groups of pictures (GOPS) occurring during a program;
identifying said information items in signal data processing said information items describing said intra-program events to provide processed data representative of intra-program events sequentially ordered by time;
deriving time indicators using time stamps in content data representing said program, said time indicators indicating when said intra-program events start;
and communicating said processed data to a device.

15. A method according to claim 14, wherein
said intra-program events comprise program elements occurring within a program including at least one of a) one or more scenes, b) episodes, c) chapters, and d) program portions and
said time indicators indicate a broadcast time when said intra-program events start.

16. A method according to claim 14, including the step of initiating generation of a display of said information items describing intra-program events representing alternative program scene sequences optionally selectable by a user.

17. A method according to claim 14, wherein
said events include events scheduled for occurrence during said program comprising at least one of, (a) web page display, (b) PIP image display, and (c) peripheral operation.

18. A method according to claim 14, wherein said method is implemented in the programmed instructions of at least one controller and including the steps of
initiating generation of an intra-program event guide of said information items and said time indicators indicate when broadcast intra-program events start, in response to user command.

19. A method according to claim 18, wherein
said intra-program event guide is hierarchically displayed in response to user selection of an icon in a displayed program guide listing available programs on a plurality of channels, and
initiating play of a program starting at a particular intra-program event using said intra-program event guide display and using time stamps in content data representing said program.

20. A method at least one processing device for providing an intra-program event guide for display, comprising the steps of:
employing at least one processing device for,
receiving information items describing intra-program events scheduled for occurrence during a program and comprising at least one of, (a) web page display, (b) software download, (c) PIP image display, and (d) peripheral operation;
collating said information items for presentation in a display;
initiating generation of an intra-program event guide display of said collated information items describing intra-program events sequentially ordered by time and including time indicators indicating when said intra-program events start, said time indicators identify different sections of a program exclusive of viewer interactive content and derived from content data representing said program; and
communicating data representing said intra-program event guide display for presentation on a reproduction device.

21. A method according to claim 20, wherein said intra-program event guide is displayed in response to user selection of an icon in a displayed program guide listing available programs on a plurality of channels.

22. A system for processing information concerning intra-program events occuring within a program, comprising;
an interface for receiving signal data containing information items describing intra-program events exclusive of viewer interactive events occuring during a program and comprising at least one of a) one or more scenes, b) episodes, c) chapters, and d) program portions;
a data processor for
identifying said information items in said signal data and processing said information items describing intra-program events to provide processed data representative of intra-program events sequentially ordered by time and deriving indicators from content data representing said program, said time indicators indicating when said intra-program events start and indicating different sections of a program and indicating a broadcast time when said intra-program events start; and
an output processor for communicating said processed data to a device.

* * * * *